(12) United States Patent
Kim et al.

(10) Patent No.: US 12,420,802 B2
(45) Date of Patent: Sep. 23, 2025

(54) METHOD AND SYSTEM FOR RECOGNIZING ROAD SURFACE

(71) Applicants: Hyundai Motor Company, Seoul (KR); Kia Corporation, Seoul (KR); Konkuk University Industrial Cooperation Corp, Seoul (KR)

(72) Inventors: Young Jae Kim, Whasung-Si (KR); In Yong Jung, Whasung-Si (KR); Jong Hoon Choi, Whasung-Si (KR); Byung Joo Kim, Whasung-Si (KR); Hyung Jin Kim, Whasung-Si (KR); So Yeong Kim, Whasung-Si (KR); Ji Eun Cho, Whasung-Si (KR); Jin Su Ha, Whasung-Si (KR); Seong Jun Kim, Whasung-Si (KR); Young Rok Son, Whasung-Si (KR); Ki Chun Jo, Whasung-Si (KR); Ji Won Seok, Whasung-Si (KR)

(73) Assignees: Hyundai Motor Company, Seoul (KR); Kia Corporation, Seoul (KR); Konkuk Univ Ind Coop Corp, Seoul (KR)

( * ) Notice: Subject to any disclaimer, the term of this patent is extended or adjusted under 35 U.S.C. 154(b) by 389 days.

(21) Appl. No.: 18/092,822

(22) Filed: Jan. 3, 2023

(65) Prior Publication Data
US 2024/0059296 A1    Feb. 22, 2024

(30) Foreign Application Priority Data
Aug. 22, 2022   (KR) .................. 10-2022-0104875

(51) Int. Cl.
*B60W 40/06*    (2012.01)
*B60W 40/105*   (2012.01)
(Continued)

(52) U.S. Cl.
CPC .......... *B60W 40/06* (2013.01); *B60W 40/105* (2013.01); *B60W 40/11* (2013.01);
(Continued)

(58) Field of Classification Search
CPC .... B60W 40/06; B60W 40/105; B60W 40/11; B60W 40/114; B60W 2420/408;
(Continued)

(56) References Cited

U.S. PATENT DOCUMENTS 9,139,204 B1 *  9/2015  Zhao ..................... B60W 40/06
9,453,941 B2 *  9/2016  Stainvas Olshansky ...................
                                                  G01S 7/4802
(Continued)

FOREIGN PATENT DOCUMENTS

EP           3063552 B1 *  7/2019  ............. G01B 11/02
WO   WO-2019070824 A1 *  4/2019  ............. G01C 21/30

OTHER PUBLICATIONS

Yi et al., "Point-Cloud-Based Road Course Estimation on Automotive Radar Data," 2021, Publisher: IEEE.*

*Primary Examiner* — Tuan C To
(74) *Attorney, Agent, or Firm* — MORGAN, LEWIS & BOCKIUS LLP (57) ABSTRACT

A road surface recognition method may include extracting first point cloud data in a front road surface region of a vehicle from point cloud data generated by LiDAR of the vehicle, generating a point cloud map by use of a local map and the first point cloud data, determining a predicted driving route of the vehicle based on motion-related data of the vehicle; and generating a road surface height profile of the predicted driving route based on the point cloud map and the predicted driving route.

18 Claims, 9 Drawing Sheets

(51) Int. Cl.
*B60W 40/11* (2012.01)
*B60W 40/114* (2012.01)
*G01S 17/89* (2020.01)
*G06F 17/17* (2006.01)

(52) U.S. Cl.
CPC ........... *B60W 40/114* (2013.01); *G01S 17/89* (2013.01); *G06F 17/17* (2013.01); *B60W 2420/408* (2024.01); *B60W 2520/14* (2013.01); *B60W 2520/16* (2013.01)

(58) Field of Classification Search
CPC .... B60W 2520/16; G01S 17/89; G01S 17/88; G06F 17/17
USPC ............................................................ 701/1
See application file for complete search history.

(56) References Cited

U.S. PATENT DOCUMENTS

| | | | |
|---|---|---|---|
| 2013/0110391 A1* | 5/2013 | Obi | B60T 8/17551 701/400 |
| 2014/0195112 A1* | 7/2014 | Lu | B60G 17/015 703/2 |
| 2015/0120244 A1* | 4/2015 | Ma | G06T 7/75 702/172 |
| 2021/0183093 A1* | 6/2021 | Park | G06V 20/588 |
| 2023/0083965 A1* | 3/2023 | Liu | G06T 7/74 382/103 |
| 2023/0236323 A1* | 7/2023 | Lee | G01S 17/86 |

\* cited by examiner

METHOD AND SYSTEM FOR RECOGNIZING ROAD SURFACE

CROSS-REFERENCE TO RELATED APPLICATION

The present application claims priority to Korean Patent Application No. 10-2022-0104875, filed on Aug. 22, 2022, the entire contents of which is incorporated herein for all purposes by this reference.

BACKGROUND OF THE PRESENT DISCLOSURE

Field of the Present Disclosure

The present disclosure relates to a method and system for recognizing a road surface through Light Detection and Ranging (LiDAR) of a vehicle.

Description of Related Art

A preview electronic control suspension system of a vehicle is a system for checking a road surface condition while the vehicle is driven and adjusting a suspension so that an impact is not transmitted to a driver when the vehicle passes a bump, etc.

Technology for recognizing a road surface around a vehicle applied to a conventional preview electronic control suspension system has used a camera sensor.

For example, the conventional preview electronic control suspension system can obtain information related to a road surface around a vehicle when the vehicle moves through surrounding road surface recognition technology using a monocular camera.

Furthermore, the conventional preview electronic control suspension system can recognize a condition of a road surface around a vehicle through stereo vision technology using two images captured at different locations through a camera.

However, in the case of conventional technology using a monocular camera, when there is no motion of a vehicle, there is a problem in that it is difficult to obtain information related to a road surface around the vehicle.

Furthermore, when the conventional stereo vision technology is used, the conventional preview electronic control suspension system can recognize a condition of a road surface through correlation analysis of two images, and correlation analysis of two images has been performed based on a feature point of each image. Extraction of a feature point of each image is greatly affected by quality of the image, and an image obtained through a camera has a large difference in quality depending on the surrounding illuminance and weather.

Conventionally, there has been the case in which a low-quality image is obtained due to ambient illuminance and weather, which affects extraction of a feature point of each image, so that the conventional preview electronic control suspension system of the vehicle cannot accurately recognize a condition of the road surface.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method and system for recognizing a road surface that substantially obviate one or more problems due to limitations and disadvantages of the related art.

Various aspects of the present disclosure are directed to providing a method and system for recognizing a road surface capable of accurately recognizing a condition of a road surface around a vehicle.

For example, an exemplary embodiment of the present disclosure may provide a method and system for recognizing a road surface through LiDAR to solve a problem of conventional road surface recognition technology using a camera in that accuracy is low depending on the environmental condition such as illuminance or weather.

Additional advantages, objects, and features of the present disclosure will be set forth in part in the description which follows and in part will become apparent to those having ordinary skill in the art upon examination of the following or may be learned from practice of the present disclosure. The objectives and other advantages of the present disclosure may be realized and attained by the structure pointed out in the written description and claims hereof as well as the appended drawings.

To achieve these objects and other advantages and in accordance with the present disclosure, as embodied and broadly described herein, a road surface recognition method includes extracting first point cloud data from point cloud data generated by use of LiDAR of the vehicle, the first point cloud data corresponding to a predetermined region with respect to the vehicle, generating a point cloud map by use of a local map and the first point cloud data, the local map including map data on the predetermined region, determining a predicted driving route of the vehicle based on motion-related data of the vehicle, and generating a road surface height profile of the predicted driving route based on the point cloud map and the predicted driving route.

The generating of the point cloud map may include determining transformation information for registration between the first point cloud data and the local map, transforming the first point cloud data into second point cloud data based on the transformation information, and generating the point cloud map by merging the second point cloud data into the local map.

The transformation information may include rotation information related to a roll and rotation information related to a pitch of the vehicle, and Z-axis movement information (Z-axis in an X, Y, and Z coordinate system) of the first point cloud data.

The process of the extracting of first point cloud data, the generating of a point cloud map, the determining of a predicted driving route, and the generating or a road surface height profile may be iterated per time instant, and the transformation information may be determined based on a point cloud map generated at a previous time instant.

The determining of transformation information may include generating a plurality of pieces of point data corresponding to a road surface in the local map, and generating a corresponding relationship between the plurality of pieces of point data and the first point cloud data.

The transforming of the first point cloud data into the second point cloud data may be performed when a root mean square error (RMSE) between the plurality of pieces of point data and the first point cloud data in the corresponding relationship is less than a predetermined threshold.

The motion-related data of the vehicle may include a yaw rate of the vehicle, a speed of the vehicle, and a wheel angle of the vehicle.

The yaw rate may be a value obtained by subtracting a pre-calculated bias error value from a yaw rate value of the vehicle obtained during movement of the vehicle, and the pre-calculated bias error value may be an average value of yaw rate values of the vehicle obtained while the vehicle is in a stationary state.

The generating of the road surface height profile may include sampling a plurality of points from the point cloud map along the predicted driving route, determining an average value of height values of a plurality of points of the second point data within a first range of a predesignated size around each of locations of the plurality of pieces of first point data in the point cloud map, and generating the average value as the road surface height profile of the predicted driving route.

The road surface recognition method may further include estimating height information of a part of the predicted driving route in which the road surface height profile is not generated through an interpolation.

The road surface recognition method may further include removing noise included in the road surface height profile through a predesignated noise removal technique.

The road surface recognition method may further include performing time synchronization of the point cloud data and the motion-related data of the vehicle based on a time stamp of the point cloud data so that time-synchronized motion-related data of the vehicle is obtained, and determining an initial location of the vehicle in a coordinate system based on the point cloud data and the time-synchronized motion-related data of the vehicle.

In another aspect of the present disclosure, a road surface recognition system for a vehicle includes an interface configured for data communication, and a processor electrically connected to the interface, wherein the processor is configured to perform receiving point cloud data from LiDAR of the vehicle and motion-related data of the vehicle from a sensing device of the vehicle through the interface, extracting first point cloud data corresponding to a predetermined region with respect to the vehicle from the point cloud data, generating a point cloud map by use of a local map and the first point cloud data, the local map including map data on the predetermined region, determining a predicted driving route of the vehicle based on motion-related data of the vehicle, and generating a road surface height profile of the predicted driving route based on the point cloud map and the predicted driving route.

The generating of the point cloud map may include determining transformation information for registration between the first point cloud data and the local map, transforming the first point cloud data into second point cloud data based on the transformation information, and generate the point cloud map by merging the second point cloud data into the local map.

The determining of transformation information may include generating a plurality of pieces of point data corresponding to a road surface in the local map, and generating a corresponding relationship between the plurality of pieces of point data and the first point cloud data.

The transforming of the first point cloud data into the second point cloud data is performed when an RMSE between the plurality of pieces of point data and the first point cloud data in the corresponding relationship is less than a predetermined threshold.

The generating of the road surface height profile may include sampling a plurality of points from the point cloud map along the predicted driving route, determine an average value of height values of a plurality of points of the second point data within a first range of a predesignated size around each of locations of the plurality of points, and generating the average value as the road surface height profile of the predicted driving route.

The processor may be configured to further perform estimating height information of a portion of the predicted driving route in which the road surface height profile is not generated through an interpolation.

The processor may be configured to further perform removing noise included in the road surface height profile through a predesignated noise removal technique.

The processor may be further configured to perform time synchronization of the point cloud data and the motion-related data of the vehicle based on a time stamp of the point cloud data so that time-synchronized motion-related data of the vehicle is obtained, and determine an initial location of the vehicle in a coordinate system for the registration based on the point cloud data and the time-synchronized motion-related data of the vehicle.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Like reference numerals refer to like elements throughout the specification. The present specification does not describe all elements of the embodiments, and general content in the field of the present disclosure to which an exemplary embodiment of the present disclosure pertains or content overlapping among the exemplary embodiments is omitted. A "unit", "module", or "device" used in the present specification may be implemented as software or hardware. According to the embodiments, a plurality of "units", "modules", or "devices" may be implemented as one element, or one "unit", "module", or "device" may include a plurality of elements.

Throughout the specification, when a part is referred to as being "connected" to another part, the part may be directly connected or indirectly connected to the other part. Furthermore, indirect connection includes connection through a wireless communication network.

Furthermore, when a part is referred to as "including" an element, another element may be further included, rather than excluding another element, unless otherwise stated.

Terms such as "first", "second", etc. are used to distinguish one element from another element, and the elements are not limited by the above-mentioned terms.

A singular expression includes the plural form unless the context clearly dictates otherwise.

In each step, an identification code is used for convenience of description, and the identification code does not describe the order of each step. Each step may be performed differently from the specified order unless context clearly indicates a specific order.

LiDAR may be used to obtain distance information from an object by emitting a laser light source and measuring light reflected back by a surrounding environment, and is characterized by being less affected by illuminance or weather of the surrounding environment and robust against the surrounding environment.

Furthermore, point cloud data generated by LiDAR mounted on a vehicle represents distance information of a surrounding environment of the vehicle.

Furthermore, when the vehicle utilizes LiDAR to obtain surrounding environment information, the vehicle may obtain height information of a road surface based on point cloud data generated by one measurement of the LiDAR, and thus may obtain information related to the road surface around the vehicle regardless of a motion state of the vehicle.

In consideration of these points, various embodiments of the present disclosure may provide road surface recognition technology through LiDAR, for example, technology configured for recognizing (also referred to as inferring) a road surface condition (also referred to as a height and a condition of a road surface) around a vehicle through point cloud data generated by LiDAR.

Furthermore, various embodiments of the present disclosure may provide technology configured for recognizing a road surface condition around a vehicle through local point cloud mapping technology around the vehicle by integrating point cloud data generated by LiDAR and data related to motion of the vehicle.

For example, various embodiments of the present disclosure may consider the case in which data density necessary to recognize the road surface by point cloud data generated through LiDAR is insufficient to integrate and accumulate the point cloud data with information related to motion of the vehicle, generating a point cloud map (also referred to as a local point cloud map), and may obtain height information of the road surface around the vehicle based on the point cloud map, estimating a condition of the surrounding road surface.

Hereinafter, a principle of action and embodiments of the present disclosure will be described with reference to the accompanying drawings.

Figure 1:
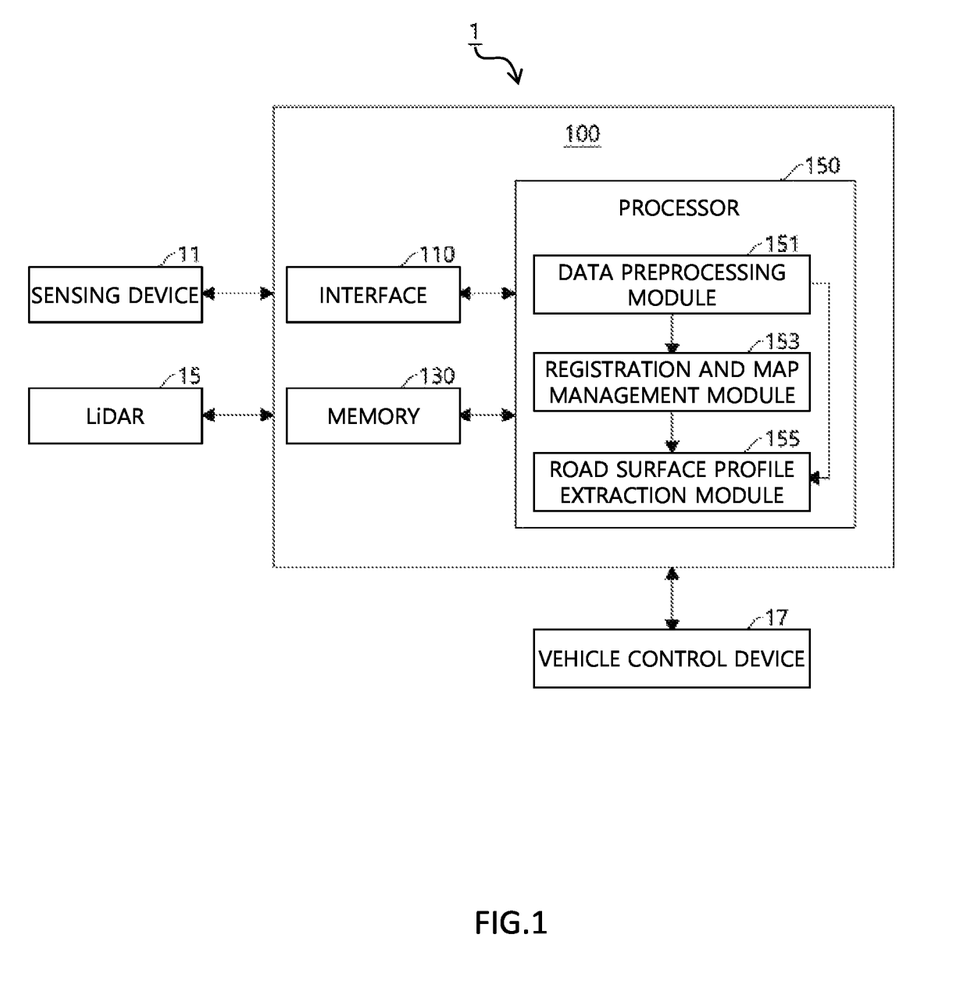
FIG. 1 is a block diagram of a vehicle according to an exemplary embodiment of the present disclosure.
Figure 2:
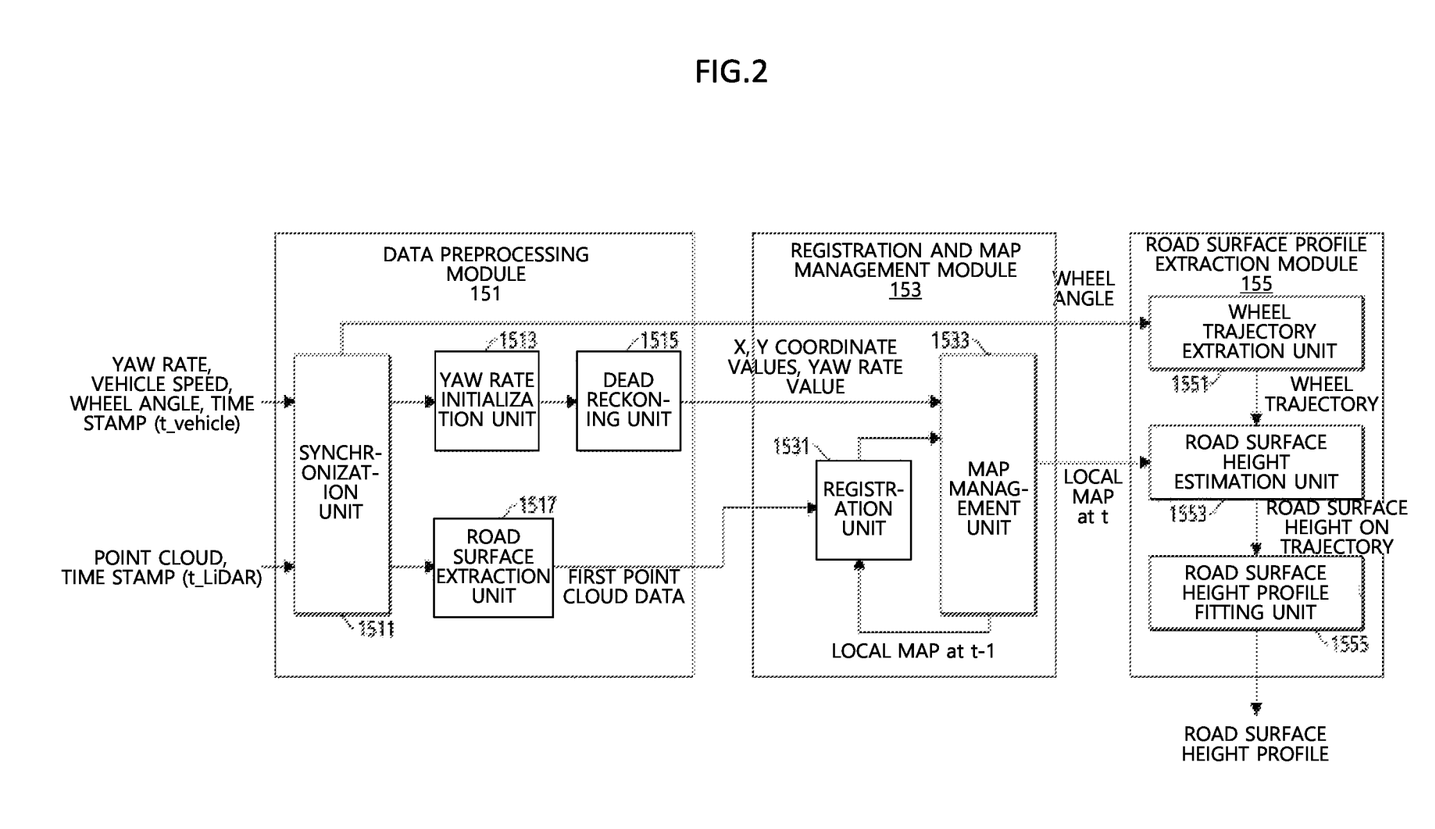
FIG. 2 is a block diagram of a processor configuration of a road surface recognition system according to an exemplary embodiment of the present disclosure.

FIG. 1 is a block diagram of a vehicle according to an exemplary embodiment of the present disclosure. FIG. 2 is a block diagram of a processor configuration of a road surface recognition system according to an exemplary embodiment of the present disclosure.

Referring to FIG. 1, a vehicle 1 may include a sensing device 11, LiDAR 15, a vehicle control device 17, and/or a road surface recognition system 100.

The sensing device 11 may include one or more devices mounted on the vehicle 1 to obtain data corresponding to information related to the inside and/or outside of the vehicle 1.

For example, the sensing device 11 may include one or more devices (also referred to as sensors) configured for obtaining and outputting motion-related data of the vehicle 1.

For example, the one or more devices may include a yaw rate sensor configured for measuring a yaw rate of the vehicle 1, a wheel speed sensor configured for measuring a wheel speed of the vehicle 1, a steering angle sensor configured for measuring a steering angle of the vehicle 1, an acceleration sensor configured for measuring acceleration of the vehicle 1, a speed sensor configured for measuring a speed of the vehicle 1, etc.

For example, motion-related data of the vehicle 1 may include a yaw rate $\phi'$ of the vehicle 1, a vehicle speed v of the vehicle 1, and/or a wheel angle $\theta$ of the vehicle 1. Furthermore, the motion-related data of the vehicle 1 may include a time stamp $t_{vehicle}$ indicating data generation (also referred to as acquisition) time information.

The LiDAR 15 may be mounted outside a main body of the vehicle 1 to generate and output LiDAR data by emitting a laser pulse toward the periphery of the vehicle 1. For example, the LiDAR data may include point cloud data and/or a time stamp $t_{LIDAR}$ indicating generation time information of the point cloud data.

The vehicle control device 17 (also referred to as a control circuit or processor) may control at least one device of the vehicle 1, and may perform various data processing and operations.

The vehicle control device 17 may include an electronic control unit (ECU) that is configured to control a power system of the vehicle 1. The control device 2000 may include a processor and a memory.

For example, the vehicle control device 17 may control driving of the vehicle 1 based on a road surface height profile generated by the road surface recognition system 100 according to an exemplary embodiment of the present disclosure.

The road surface recognition system 100 may include an interface 110, a memory 130, and/or a processor 150.

The interface 110 may transmit a command or data input from another device of the vehicle 1 or a user to another component of the road surface recognition system 100, or output a command or data received from another component of the road surface recognition system 100 to another device of the vehicle 1.

The interface 210 may include a communication module (also referred to as a communication circuit) to communicate with the sensing device 11, the LiDAR 15, and/or another device of the vehicle 1.

For example, the communication module may include a wired communication module (for example, a powerline communication module) and/or a wireless communication module (for example, a cellular communication module, a Wi-Fi communication module, a short-range wireless communication module, and/or a global navigation satellite system (GNSS) communication module). In addition, the communication module may include a communication module configured for performing communication between devices of the vehicle 2, for example, controller area network (CAN) communication and/or local interconnect network (LIN) communication through a vehicle communication network.

The memory 130 may store various data used by at least one component of the road surface recognition system 100, for example, input data and/or output data for a software program and a command related thereto.

The memory 130 includes a nonvolatile memory such as a cache, a read only memory (ROM), a programmable ROM (PROM), an erasable programmable ROM (EPROM), an electrically erasable programmable ROM (EEPROM), and/or a flash memory, and/or a volatile memory such as a random access memory (RAM).

The processor 150 (also referred to as a controller or control circuit) may control at least one of other components (for example, a hardware component and/or a software component (software program)) of the road surface recognition system 100, and perform various data processing and operations.

The processor 150 may receive motion-related data of the vehicle 1 from the sensing device 11 through the interface 110. The processor 150 may receive LiDAR data from the LiDAR 15 through the interface 110.

The processor 150 may perform a road surface recognition operation based on the received motion-related data and LiDAR data of the vehicle 1, for example, generate and output a road surface profile.

The processor 150 may include a data preprocessing module 151, a registration and map management module 153, and/or a road surface profile extraction module 155.

The data preprocessing module 151 may perform preprocessing on the received data, for example, the received point cloud data and the received motion-related data of the vehicle 1.

For example, before registering (and accumulating) the received point cloud data on a map, the data preprocessing module 151 may extract only point cloud data (also referred to as first point cloud data) within a region of interest (ROI) from among pieces of the received point cloud data.

Furthermore, the data preprocessing module 151 may perform preprocessing on previously obtained data, for example, may determine an initial location of the vehicle 1 in a coordinate system (for example, a virtual coordinate system or a coordinate system in a point cloud map) for registration between the first point cloud data and the map based on the received motion-related data of the vehicle 1.

Referring to FIG. 2, the preprocessing module 151 may include a time synchronization unit 1511, a yaw rate initialization unit 1513, a dead reckoning unit 1515, and/or a road surface extraction unit 1517.

The time synchronization unit 1511 may receive motion-related data of the vehicle 1.

For example, the motion-related data of the vehicle 1 may include a yaw rate $\varnothing'$ of the vehicle 1, a vehicle speed v of the vehicle 1, a wheel angle θ of the vehicle 1, and/or a time stamp $t_{vehicle}$.

The time synchronization unit 1511 may receive point cloud data and/or LiDAR data including a time stamp $t_{LiDAR}$.

The time synchronization unit 1511 may consider that the motion-related data and the point cloud data of the vehicle 1 obtained from different devices are highly likely to have been measured at different times, and perform time synchronization so that two pieces of data have information related to the same time.

For example, the time synchronization unit 1511 may sample motion data of the vehicle 1 based on a time of the LiDAR data so that a time of the point cloud data and a time of the motion data of the vehicle 1 are synchronized with each other.

For example, the time synchronization unit 1511 may perform time synchronization by transforming the motion data of the vehicle 1 based on the time stamp $t_{LiDAR}$ of the LiDAR data. For example, the time synchronization unit 1511 may predict the motion data of the vehicle 1 at a time corresponding to the time stamp of the LiDAR data, and transform the motion data of the vehicle 1 into the predicted motion data.

The yaw rate initialization unit 1513 may perform an operation of removing an error considering that information related to a yaw rate representing a rotation speed about a vertical axis when the vehicle 1 turns among pieces of the motion data of the vehicle 1 may have an error (also referred to as a bias error).

For example, the yaw rate initialization unit 1513 may identify a stationary state of the vehicle 1 based on motion data of the vehicle 1. Furthermore, the yaw rate initialization unit 1513 may accumulate yaw rate values obtained while the vehicle 1 is in the stationary state (or during a predetermined time period while the vehicle 1 is in the stationary state), and determine an average value of the yaw rate values obtained while the vehicle 1 is in the stationary state. Furthermore, the yaw rate initialization unit 1513 may determine the determined average value as a bias error value of the yaw rate.

For example, the yaw rate initialization unit 1513 may identify motion of the vehicle 1 based on motion data of the vehicle 1. Furthermore, the yaw rate initialization unit 1513 may remove the bias error of the yaw rate by subtracting the bias error value of the yaw rate from the yaw rate value obtained while the vehicle 1 is in motion.

The dead reckoning unit 1515 may determine an initial location of the vehicle 1 in a coordinate system for registering point cloud data with a map (for example, a virtual coordinate system or a coordinate system in a point cloud map) based on motion-related data of the vehicle 1, for example, a speed of the vehicle 1 and a value of a yaw rate from which a bias error is removed.

Determining the initial location of the vehicle 1 is important to register the point cloud data with the map.

The dead reckoning unit 1515 may determine (also referred to as estimate) a location of the vehicle 1 by accumulating motion-related data (also referred to as motion information) of the vehicle 1. For example, the dead reckoning unit 1515 may determine the location of the vehicle 1 by integrating the speed of the vehicle 1 and the value of the yaw rate from which the bias error is removed with respect to time.

The dead reckoning unit 1515 may determine the determined location of the vehicle 1 as an initial location of the vehicle 1 before registering of the point cloud data.

The dead reckoning unit 1515 may transmit information related to the initial location of the vehicle 1, for example, an X-axis coordinate value and a Y-axis coordinate value to the registration and map management module 153.

Furthermore, the dead reckoning unit 1515 may transmit the value of the yaw rate from which the bias error of the vehicle 1 is removed (also referred to as a heading angle value) to the registration and map management module 153.

The road surface extraction unit 1517 may consider that, when all the point cloud data is applied during registration of the point cloud data, a calculation time of the processor 150 increases, and even point cloud data lacking validity may be used for calculation, and may allow first point cloud data included in a designated ROI among pieces of the point cloud data to be used for the registration.

For example, the road surface extraction unit 1517 may set an ROI corresponding to a front road surface to generate a point cloud map using first point cloud data of the front road surface of the vehicle 1.

Furthermore, the road surface extraction unit 1517 may extract the first point cloud data included in the set ROI from the point cloud data and apply the extracted first point cloud data to the registration for generating a point cloud map.

For example, the road surface extraction unit 517 may extract the first point cloud data included in the ROI, and a point cloud included in the ROI at the instant time may correspond to a predesignated range of the front road surface on a route on which the vehicle 1 travels.

The registration and map management module 153 may register the first point cloud data with the map based on data preprocessed through the data preprocessing module 151.

Maps may be broadly divided into a local map and a global map. The local map means a map that displays only a certain region around the vehicle 1 based on the vehicle 1, and the global map means a map that displays the entire region including a certain region around the vehicle 1.

Even though the local map cannot provide information related to a global region, the local map utilizes a small amount of data, and thus has an advantage in that data processing of the processor 150 is fast. Accordingly, the registration and map management module 153 in the exemplary embodiment of the present disclosure may register preprocessed point cloud data with a local map corresponding to a location at which the vehicle 1 is currently traveling.

The registration and map management module 153 may include a registration unit 1531 and a map management unit 1533.

The registration unit 1531 may receive first point cloud data (ground $pcd_t$) corresponding to the road surface from the data preprocessing module 151. Furthermore, the registration unit 1531 may receive a previously generated local map (Local $Map_{t-1}$) from the map management unit 1533.

The registration unit 1531 may register the first point cloud data with the road surface of the local map configured according to a current location of the vehicle 1 based on the received first point cloud data.

For example, matching of the first point cloud data with the road surface of the local map configured according to the current location of the vehicle 1 may be performed using a point to line iterative closet point (ICP) algorithm.

For example, the registration unit 1531 may sample points corresponding to the road surface of the local map configured according to the current location of the vehicle 1 based on the first point cloud data. The registration unit 1531 may generate a correspondence relationship between the sampled points and points of the first point cloud data.

According to a registering operation of the registration unit 1531, the first point cloud data may be aligned in the local map, that is, aligned with the road surface of the local map. In the present instance, the registration unit 1531 may identify transformation information that allows highest alignment accuracy, and provide the transformation information to the map management unit 1533.

For example, the transformation information may include rotation information $\psi$ for a roll and rotation information $\theta$ for a pitch of the vehicle 1, and Z-axis movement information Z of the point cloud data corresponding to the road surface based on the point cloud map. For example, the transformation information may be determined based on first point cloud data (ground $pcd_t$) corresponding to the road surface and/or a previously generated local map (Local $Map_{t-1}$).

The map management unit 1533 may output a local map according to the current location of the vehicle 1 by a moving distance of the vehicle 1. For example, the current location of the vehicle 1 may be identified through a global positioning system (GPS) of the vehicle 1, and map data including a local map may be stored in the memory 130 in advance.

The map management unit 1533 may transform the first point cloud data based on the transformation information provided according to the registering operation of the registration unit 1531.

For example, the map management unit 1533 may transform the first point cloud data into second point cloud data based on the rotation information $\psi$ for the roll and rotation information $\theta$ for the pitch of the vehicle 1, and Z-axis movement information Z of the point cloud data corresponding to the road surface based on the point cloud map.

The map management unit 1533 may add the transformed point cloud data (also referred to as the second point cloud data) to the local map corresponding to the current location of the vehicle 1, and finally complete a local map (Local $Map_t$) (also referred to as a point cloud map or a local point cloud map).

For example, when an error (for example, RMSE) between corresponding points corresponding to the road surface in the local map configured according to the current location of the vehicle 1 and the first point cloud data is less than a predetermined threshold, the map management unit 1533 may perform a map merging operation based on transformation information provided from the registration unit 1531. The map management unit 1533 may transform the first point cloud data into the second point cloud data based on the transformation information provided from the registration unit 1531, and then merge the second point cloud data into the local map corresponding to the current location of the vehicle 1 to finally generate a local map (Local $Map_t$) (also referred to as a point cloud map or a local point cloud map).

For example, when the error (for example, RMSE) between corresponding points corresponding to the road surface in the local map and the first point cloud data is equal to or greater than the predetermined threshold, the map management unit 1533 may skip the corresponding frame so that the first point cloud data is not applied to location map generation.

Furthermore, the map management unit 1533 may continuously maintain the local map corresponding to driving of the vehicle 1 by removing, from the local map, data corresponding to a region which is no longer close to the vehicle 1 (for example, points of the point cloud data and/or data included in the local map) according to motion of the vehicle 1.

For example, when a rear wheel axle of the vehicle 1 passes through a certain point included in the local map, the map management unit 1533 may delete data of the corresponding point.

The road surface profile extraction module 155 may receive a wheel angle of the vehicle 1 from the data preprocessing module 151, receive a local map (Local Map$_t$) generated from the registration and map management module 153, and generate and output a height profile of the road surface.

The road surface profile extraction module 155 may include a wheel trajectory extraction unit 1551, a road surface height estimation unit 1553, and a road surface height profile fitting unit 1555.

The wheel trajectory extraction unit 1551 may extract a wheel trajectory of the vehicle 1, that is, a predicted route, based on a received wheel angle of the vehicle 1 and unique information of the vehicle 1 stored in advance.

For example, the unique information of the vehicle 1 may include information related to a wheel base, which is a length from a central axis of a front wheel of the vehicle 1 to a central axis of a rear wheel thereof, and a wheel track, which is a length from a central axis of a left wheel of the vehicle 1 to a central axis of a right wheel thereof, and the information may be considered as a mechanical condition of the vehicle 1.

For example, a predicted route of the vehicle 1 may be determined based on information related to the wheelbase and the wheel track of the vehicle 1 and a ratio of wheel rotation to steering wheel rotation. When a steering wheel is rotated to steer the vehicle 1, front wheels of the vehicle 1 rotate, the front wheels of the vehicle 1 draw a circular track due to the wheelbase and the wheel track, and such a track may be a predicted route of the vehicle 1. According to such a principle, the wheel track extraction unit 1551 may extract the predicted route of the vehicle 1 based on the wheel angle of the vehicle 1 and the unique information of the vehicle 1 stored in advance.

Meanwhile, the predicted route of the vehicle 1 may be extracted by applying another conventional predicted route extraction technique.

The road surface height estimation unit 1553 may determine a road surface height on the track of the vehicle 1 (also referred to as a height of the road surface on the predicted route) based on the wheel track (also referred to as a predicted route) of the vehicle 1 and a local map (Local Map$_t$) (also referred to as a point cloud map or a local point cloud map) received from the registration and map management module 153.

The road surface height estimation unit 1553 may extract height information of the road surface on the predicted route of the vehicle 1 by applying the predicted route of the vehicle 1 to the local map (Local Map$_t$) (also referred to as a point cloud map or a local point cloud map).

For example, the road surface height estimation unit 1553 may sample the predicted route of the vehicle 1 at predesignated intervals, that is, may sample points corresponding to the point cloud data on the predicted route in the local map at predesignated intervals. In addition, the road surface height estimation unit 1553 may determine height information by determining an average value of heights of adjacent neighboring points for all locations of the sampled points at predesignated intervals in the local map.

For example, the road surface height estimation unit 1553 may determine an average value of heights of neighboring points included within a predetermined radius for each of the sampled points at predesignated intervals in the local map, and determine the determined average value as height information of the corresponding sampled points.

For example, height information for each of all the sampled points in the local map may be configured as a road surface height profile of the predicted route of the vehicle 1.

The road surface height profile fitting unit 1555 may output a road surface height profile based on a road surface height on the track of the vehicle 1, that is, height information of the road surface on the predicted route.

The road surface height profile fitting unit 1555 may generate and output a road surface height profile of the predicted route of the vehicle 1 based on height information for each of all the sampled points in the local map.

For example, the road surface height profile fitting unit 1555 may apply an interpolation technique and/or a noise removal technique to generate and output a road surface height profile of the predicted route of the vehicle 1 based on height information for each of all the sampled points in the local map.

In the case of a height profile formed by operation of the road surface height estimation unit 1553, noise may be included, and height information may not be extracted at an arbitrary point.

Accordingly, in the case of a part in which there is no point data on the predicted route, the road surface height profile fitting unit 1555 may predict height information based on surrounding height information through the interpolation technique. For example, the interpolation technique may be predefined so that piecewise cubic Hermite interpolation is applied, and furthermore, various interpolation techniques such as linear interpolation may be applied.

Furthermore, the road surface height profile fitting unit 1555 may remove noise through a noise removal technique. For example, as the noise removal technique, it is possible to apply various techniques such as a moving average filter or an exponential attenuation filter.

Meanwhile, in the above-described embodiment of FIG. 1, the vehicle control device 17 and the processor 150 have been described as separate components. However, according to another exemplary embodiment of the present disclosure, the processor 150 may be included in the vehicle control device 17.

Furthermore, in the exemplary embodiment of FIG. 2 described above, it has been described that the point cloud data included in the ROI rather than the entire point cloud data is used for the registration. However, according to another exemplary embodiment of the present disclosure, the entire point cloud data may be used for the registration. Furthermore, according to another exemplary embodiment of the present disclosure, a global map rather than a local map may be used for registration.

Figure 3:
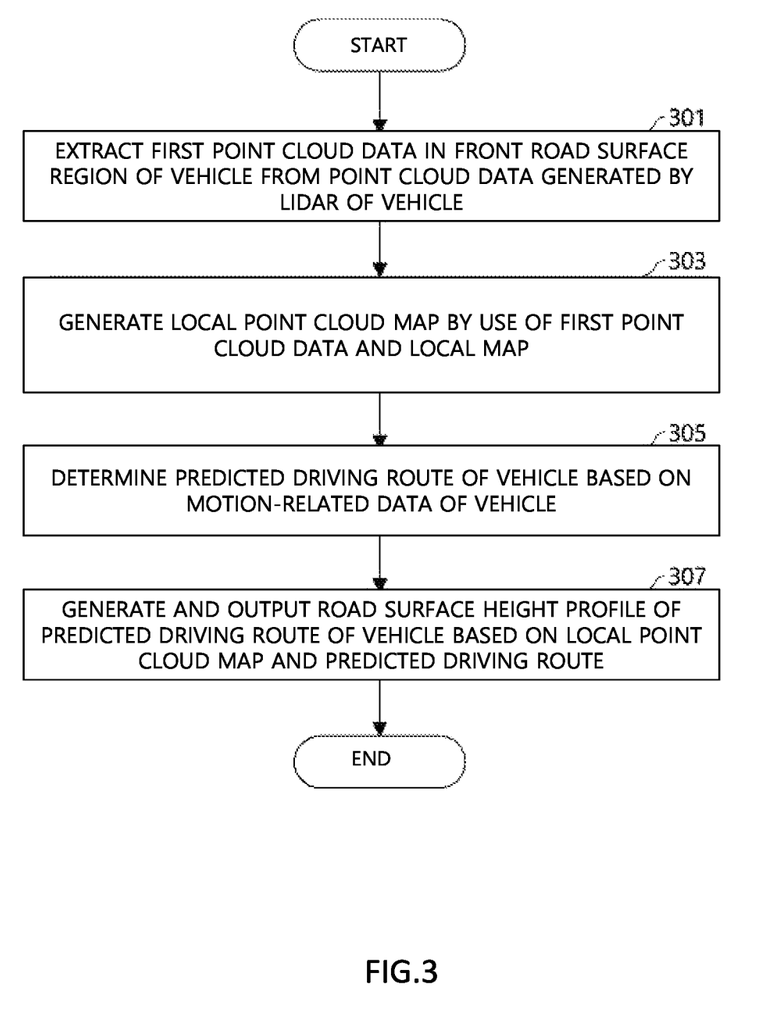
FIG. 3 is a flowchart of an operation of the road surface recognition system according to an exemplary embodiment of the present disclosure.

FIG. 3 is a flowchart of an operation of the road surface recognition system 100 (and/or processor 150) according to an exemplary embodiment of the present disclosure. FIG. 4 is a diagram illustrating an output result according to an operation of the road surface recognition system 100 according to an exemplary embodiment of the present disclosure.

Referring to FIG. 3, the road surface recognition system 100 may extract first point cloud data in a front road surface region of the vehicle 1 from point cloud data generated by the LiDAR 15 of the vehicle 1 (301).

The road surface recognition system 100 may receive LiDAR data from the LiDAR 15 of the vehicle 1 and may receive motion-related data of the vehicle 1 from the sensing device 11.

For example, the LiDAR data may include point cloud data and a time stamp. Furthermore, the motion-related data of the vehicle 1 may include a yaw rate of the vehicle 1, a speed of the vehicle 1, a wheel angle of the vehicle 1, and/or a time stamp.

The road surface recognition system 100 may generate a point cloud map by use of the first point cloud data and a local map including map data of a predetermined region adjacent to the location of the vehicle 1 (303).

The road surface recognition system 100 may generate a plurality of pieces of point data corresponding to the road surface in the local map, and generate a correspondence relationship between the plurality of pieces of point data and the first point cloud data to register the local map and the first point cloud data.

The road surface recognition system 100 may determine transformation information for registering the first point cloud data with the local map.

For example, the transformation information may include rotation information related to the roll and rotation information related to the pitch of the vehicle 1, and Z-axis movement information of the first point cloud data, and the present information may be determined based on the previously generated local map.

The road surface recognition system 100 may transform the first point cloud data into the second point cloud data based on the transformation information.

For example, the road surface recognition system 100 may transform the first point cloud data into the second point cloud data based on the transformation information in response to an RMSE between the plurality of pieces of point data and the first point cloud data, a corresponding relationship of which is generated according to the above-described registration, being less than a predetermined threshold.

When the RMSE between the plurality of pieces of point data and the first point cloud data, the corresponding relationship of which is generated according to the above-described registration, is greater than the predetermined threshold, the road surface recognition system 100 may not apply the first point cloud data to local map merging. That is, when the RMSE between the plurality of pieces of point data and the first point cloud data, the corresponding relationship of which is generated according to the above-described registration, is greater than the predetermined threshold, the road surface recognition system 100 may not perform an operation of transforming the first point cloud data into the second point cloud data.

The road surface recognition system 100 may generate a point cloud map by merging the second point cloud data into the local map.

The road surface recognition system 100 may determine a predicted driving route of the vehicle 1 based on motion-related data of the vehicle 1 (305).

The motion-related data of the vehicle 1 may include a yaw rate of the vehicle 1, a speed of the vehicle 1, and a wheel angle of the vehicle 1.

For example, the yaw rate of the vehicle 1 may be a value obtained by subtracting a pre-calculated bias error value from a yaw rate value of the vehicle 1 obtained during movement of the vehicle 1. Furthermore, the pre-calculated bias error value may be an average value of yaw rate values of the vehicle 1 obtained while the vehicle 1 is in a stationary state (or during a predesignated time period while the vehicle 1 is in a stationary state).

The road surface recognition system 100 may generate and output a road surface height profile of the predicted driving route of the vehicle 1 based on the point cloud map and the predicted driving route (307).

The road surface recognition system 100 may apply the predicted driving route of the vehicle 1 to the point cloud map, and sample a plurality of pieces of first point data on the predicted driving route in the point cloud map.

The road surface recognition system 100 may determine an average value of height values of a plurality of pieces of second point data within a first range of a predesignated size around each location of each of the pieces of first point data in the point cloud map.

The road surface recognition system 100 may generate the determined average value as a road surface height profile of the predicted driving route.

Figure 4A:
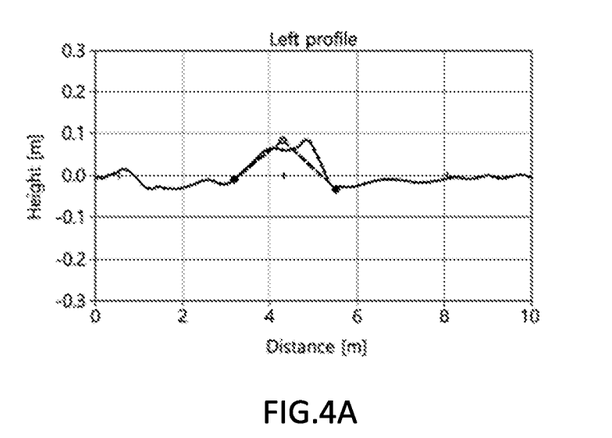
FIG. 4A and FIG. 4B are diagrams illustrating an output result according to an operation of the road surface recognition system according to an exemplary embodiment of the present disclosure.

For example, the road surface height profile may be output as a graph of a height for each distance as illustrated in FIG. 4A.

Figure 4B:
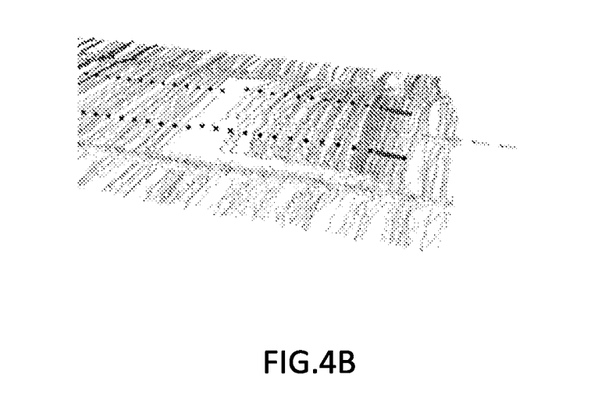
Figure 5:
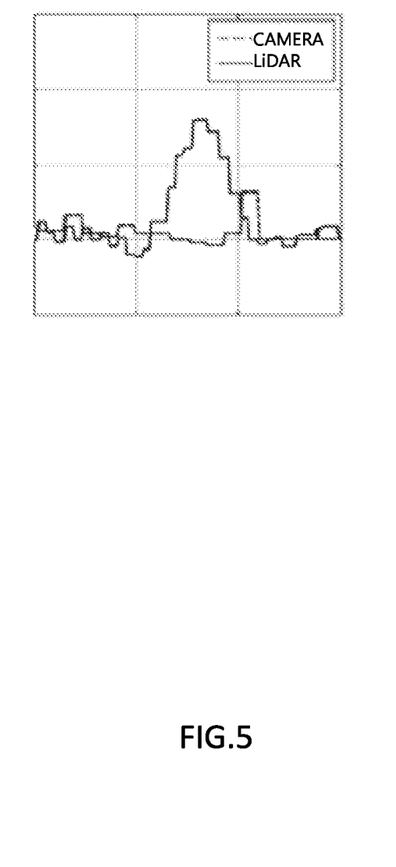
FIG. 5, FIG. 6, FIG. 7, FIG. 8, and FIG. 9 are diagrams illustrating results of road surface profiles generated using a camera and LiDAR through experiments.
Figure 6:
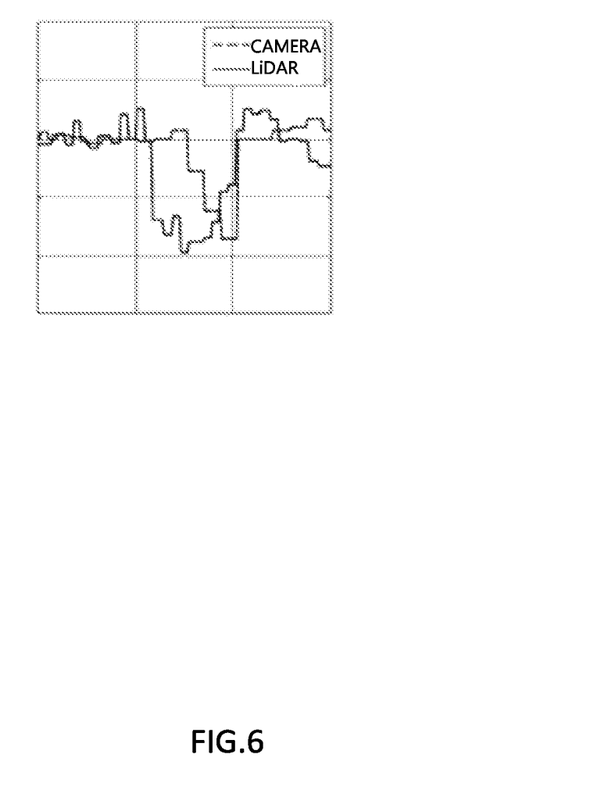
Figure 7:
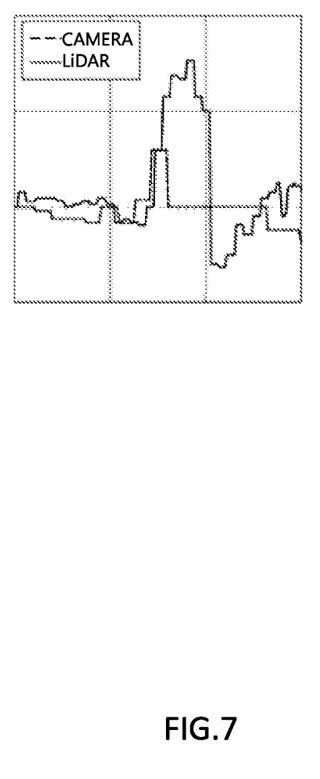
Figure 8:
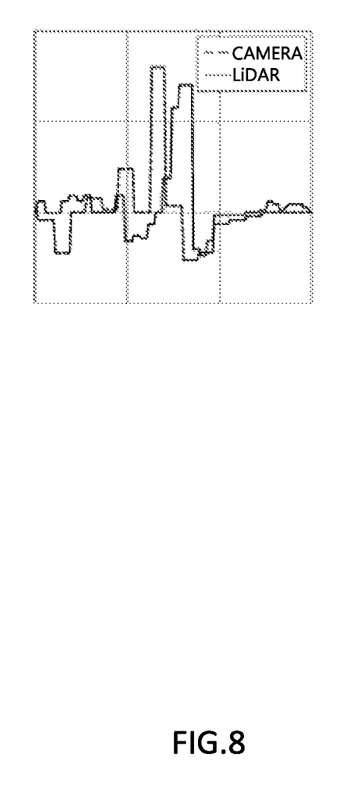
Figure 9:
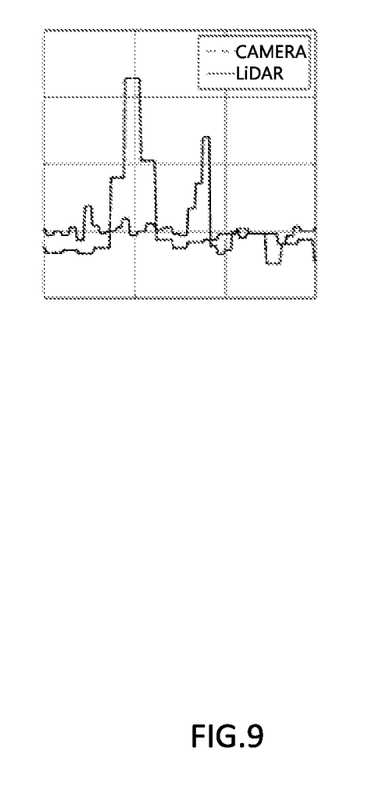

Furthermore, for example, when a point cloud map and a road surface height profile are visualized, the road surface height profile may be output as points on the point cloud map as illustrated in FIG. 4B.

Meanwhile, in addition to the above-described embodiment of FIG. 3, the road surface recognition system 100 may estimate height information of a part in which a road surface height profile is not generated on the predicted driving route of the vehicle 1 based on surrounding height information of a part in which a road surface height profile is not generated within a second range of a predesignated size on the predicted driving route of the vehicle 1 through a predesignated interpolation technique. Furthermore, the road surface recognition system 100 may include the estimated height information in the road surface height profile.

Furthermore, in addition to the above-described embodiment of FIG. 3, the road surface recognition system 100 may further perform a noise removal operation included in the road surface height profile through a predesignated noise removal technique.

FIG. 5, FIG. 6, FIG. 7, FIG. 8, and FIG. 9 are diagrams illustrating results of road surface profiles generated using a camera and LiDAR through experiments. An x-axis of each of the figures represents a distance of a recognized profile, and a z-axis represents a height of the recognized profile. These experiments are based on data of various road surface obstacles in a night situation obtained through the LiDAR and the camera.

Referring to FIG. 5, FIG. 6, FIG. 7, FIG. 8, and FIG. 9, it may be seen that, in the case of a road surface profile obtained at night through the camera, accuracy is poor compared to the LiDAR. Accordingly, when the vehicle is driven at night, superior performance is obtained in the case of using the LiDAR data generated through the LiDAR rather than the case of using the data generated by the camera. Furthermore, such LiDAR data may be utilized for various applications of the vehicle.

The above-described embodiments may be implemented in a form of a recording medium storing instructions executable by a computer. Instructions may be stored in a form of program code, and may perform operations of the disclosed exemplary embodiments by generating a program module when executed by a processor. The recording medium may be implemented as a computer-readable recording medium.

The computer-readable recording medium includes any type of recording medium in which instructions readable by the computer are stored. Examples thereof may include a ROM, a RAM, a magnetic tape, a magnetic disk, a flash memory, an optical data storage device, etc.

A method and system for recognizing a road surface of the present disclosure may provide road surface recognition technology configured for estimating a height and a condition of a road surface around a vehicle through LiDAR of the vehicle.

For example, a method and system for recognizing a road surface of the present disclosure may provide road surface recognition technology with high accuracy regardless of environmental conditions such as illuminance and weather.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method for controlling driving of a vehicle, the method comprising:
   performing, by a processor in the vehicle, time synchronization of point cloud data generated by use of Light Detection and Ranging (LiDAR) of the vehicle and motion-related data of the vehicle based on a time stamp of the point cloud data to obtain time-synchronized motion-related data of the vehicle;
   determining, by the processor, an initial location of the vehicle based on the point cloud data and the time-synchronized motion-related data of the vehicle;
   extracting, by the processor, first point cloud data from the point cloud data, the first point cloud data corresponding to a predetermined region with respect to the vehicle;
   generating, by the processor, a point cloud map by use of a local map and the first point cloud data, the local map including map data on the predetermined region;
   determining, by the processor, a predicted driving route of the vehicle based on the motion-related data of the vehicle;
   generating, by the processor, a road surface height profile of the predicted driving route based on the point cloud map and the predicted driving route; and
   controlling, by a controller in the vehicle, the driving of the vehicle based on road surface height profile.

2. The method of claim 1, wherein the generating of the point cloud map includes:
   determining transformation information for registration between the first point cloud data and the local map;
   transforming the first point cloud data into second point cloud data based on the transformation information; and
   generating the point cloud map by merging the second point cloud data into the local map.

3. The method of claim 2,
   wherein the transformation information includes rotation information related to a roll and rotation information related to a pitch of the vehicle, and Z-axis movement information of the first point cloud data.

4. The method of claim 3,
   wherein a process of the extracting of the first point cloud data, the generating of the point cloud map, the determining of the predicted driving route, and the generating of the road surface height profile is iterated per time instant, and the transformation information is determined based on a point cloud map generated at a previous time instant.

5. The method of claim 2, wherein the determining of transformation information includes:
   generating a plurality of pieces of point data corresponding to a road surface in the local map; and
   generating a corresponding relationship between the plurality of pieces of point data and the first point cloud data.

6. The method of claim 5,
   wherein the transforming of the first point cloud data into the second point cloud data is performed when a root mean square error (RMSE) between the plurality of pieces of point data and the first point cloud data in the corresponding relationship is less than a predetermined threshold.

7. The method of claim 1,
   wherein the motion-related data of the vehicle includes a yaw rate of the vehicle, a speed of the vehicle, and a wheel angle of the vehicle.

8. The method of claim 7,
   wherein the yaw rate is a value obtained by subtracting a pre-calculated bias error value from a yaw rate value of the vehicle obtained during movement of the vehicle, and wherein the pre-calculated bias error value is an average value of yaw rate values of the vehicle obtained while the vehicle is in a stationary state.

9. The method of claim 2, wherein the generating of the road surface height profile includes:
   sampling a plurality of points from the point cloud map along the predicted driving route;
   determining an average value of height values of a plurality of points of the second point data within a first range of a predesignated size around each of locations of the plurality of points; and
   generating the average value as the road surface height profile of the predicted driving route.

10. The method of claim 9, further including:
    estimating height information of a portion of the predicted driving route in which the road surface height profile is not generated through an interpolation.

11. The method of claim 9, further including removing noise included in the road surface height profile.

12. A system for controlling driving of a vehicle, the system comprising:
    an interface configured for data communication;
    a processor electrically connected to the interface; and
    a controller configured to control the driving of the vehicle, wherein the processor is configured to perform:
  receiving point cloud data from Light Detection and Ranging (LiDAR) of the vehicle and motion-related data of the vehicle from a sensing device of the vehicle through the interface;
  performing time synchronization of the point cloud data and the motion-related data of the vehicle based on a time stamp of the point cloud data to obtain time-synchronized motion-related data of the vehicle;
  determining an initial location of the vehicle based on the point cloud data and the time-synchronized motion-related data of the vehicle;
  extracting first point cloud data corresponding to a predetermined region with respect to the vehicle from the point cloud data;
  generating a point cloud map by use of a local map and the first point cloud data, the local map including map data on the predetermined region;
  determining a predicted driving route of the vehicle based on motion-related data of the vehicle; and
  generating a road surface height profile of the predicted driving route based on the point cloud map and the predicted driving route, and
  wherein the controller is configured to control the driving of the vehicle based on the road surface height profile.

13. The system of claim 12, wherein the generating of the point cloud map includes:
  determining transformation information for registration between the first point cloud data and the local map;
  transforming the first point cloud data into second point cloud data based on the transformation information; and
  generates the point cloud map by merging the second point cloud data into the local map.

14. The system of claim 13, wherein the determining of transformation information includes:
  generating a plurality of pieces of point data corresponding to a road surface in the local map; and
  generating a corresponding relationship between the plurality of pieces of point data and the first point cloud data.

15. The system of claim 14,
  wherein the transforming of the first point cloud data into the second point cloud data is performed when a root mean square error (RMSE) between the plurality of pieces of point data and the first point cloud data in the corresponding relationship is less than a predetermined threshold.

16. The system of claim 12, wherein the generating of the road surface height profile includes:
  sampling a plurality of points from the point cloud map along the predicted driving route;
  determining an average value of height values of a plurality of points of the second point data within a first range of a predesignated size around each of locations of the plurality of points; and
  generating the average value as the road surface height profile of the predicted driving route.

17. The system of claim 16, wherein the processor is configured to further perform:
  estimating height information of a portion of the predicted driving route in which the road surface height profile is not generated through an interpolation.

18. The system of claim 17, wherein the processor is configured to further perform removing noise included in the road surface height profile.

* * * * *